United States Patent [19]

Pittinger

[11] 4,020,553

[45] May 3, 1977

[54] FILAMENT VEGETATION TRIMMER WITH BASKET WOVEN AUTOMATIC FEED MEANS AND METHOD

[75] Inventor: Cynthia Ann Pittinger, Weatherford, Tex.

[73] Assignee: Charles B. Pittinger, Weatherford, Tex.

[22] Filed: Sept. 3, 1976

[21] Appl. No.: 720,237

[52] U.S. Cl. .................................. 30/347; 56/12.7
[51] Int. Cl.$^2$ ....................................... A01D 55/18
[58] Field of Search ............. 30/276, 347; 56/12.7, 56/16.9, 295; 15/198

[56] References Cited

UNITED STATES PATENTS

| 3,826,068 | 7/1974 | Ballas | 30/276 X |
| 3,859,776 | 1/1975 | Ballas | 30/276 X |

FOREIGN PATENTS OR APPLICATIONS

| 6,938,265 | 10/1969 | Germany | 56/12.7 |
| 556,632 | 12/1974 | Switzerland | 30/276 |

Primary Examiner—James L. Jones, Jr.
Assistant Examiner—J. C. Peters

[57] ABSTRACT

An automatic-deployment reel-type cutter head for a filament trimmer provides for manufacturing purposes an easy-wind structure and for operating purposes, a winding pre-selectivity of filament-deployment length from the cutter head. The cutter head structure also during cutting operations protects filament wound on it but not yet deployed. In a preferred embodiment the reel comprises a first circular member with an array of postlike elements upstanding from the rim and a second circular member for capping the free ends of the array of upstanding elements to prevent transient-load disarray of the filament during operation.

12 Claims, 3 Drawing Figures

FILAMENT VEGETATION TRIMMER WITH BASKET WOVEN AUTOMATIC FEED MEANS AND METHOD

This invention relates generally to filament trimmer type vegetation cutters and relates more particularly to automatic-deployment cutter heads for same.

In the prior art a filament-wound cutter head disk has been disclosed which deploys a fresh cutting length of the filament automatically each time a prior cutting-length of the filament snaps off or wears off at the disk during cutting operations. U.S. Pat. No. 3,895,440 issued July 22, 1975, to C. B. Pittinger, Jr. for DISK FOR FILAMENT TRIMMER disclosed that invention, but limited the L/D ratio of the protruding filament vs the diameter of the disk.

The present invention is intended to provide a structural arrangement in the disk further protecting the filament during operation and making the disk easier to wind, and additionally to provide improved range of filament deployment length, or L/D ratio.

L/D ratio is defined as the length of protruding filament versus the diameter of the filament holder or basket cage. I teach that thick or large cross-sectional diameter filaments must have an L/D ratio of greater than (1) one.

SUMMARY OF INVENTION

In accordance with my invention, a trimmer or cutter disk adapted to be rotated by any suitable means is provided with a plurality of upstanding spaced circumferentially located winding elements which may be in the form of pins, posts, blades or angular segments or of any other suitable form, providing openings between them for winding or weaving the filament. The upstanding segments are smooth on the outer or circumferential portion to prevent abrasion of the filament at the smooth portions and, some at least, of these upstanding elements are also provided with abrasive or sharpened surfaces, which are intended to cut or abrade selected portions of the filament to release new protruded cutting length or portions after an initial protruding length or portion has been severed and discarded.

The cutting filament is applied to the upstanding elements by a weaving operation similar to that employed in weaving wicker baskets. In such operation, the major portion of the filament is wound externally and circumferentially about the smooth outer portions of the upstanding elements while spaced portions of the filament are wound externally so as to contact the abrasive or sharpened portions of the upstanding elements. The disk on which the upstanding elements are molded may be provided with a cover spaced from the aforesaid disk by the upstanding elements so that the composite cutting assembly resembles a cup-shaped cylinder wherein the outer portion of the cylinder is composed of the spaced upstanding elements. The space between the elements is sufficient for convenient hand winding or weaving of the filament. The composite assembly may be referred to as a "basket."

An advantage of weaving about the outer perimeter is that the length of filament protruding outwardly and serving as a cutter element may be greater than the diameter of the basket. This means the convolutions may be wound greater than one-half of the circumference of the basket. In similar devices known to me, the filament may be wound on a flat disk only equal to the diameter or less. I have found that if a line is too short it does not have a good whip action and accordingly it is an advantage to have the protruding line length greater than the diameter of the disk that it is woven on. This will be more fully understood from the following detailed description. In accordance with my invention more than one filament, as for example two, three or four filaments may be wound about the upstanding elements and protruding portions or length may be provided at radially spaced locations for faster cutting of the vegetation as will be apparent to those skilled in the art.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings in which like characters of reference are used to designate like parts, and in which.

Figure 1:
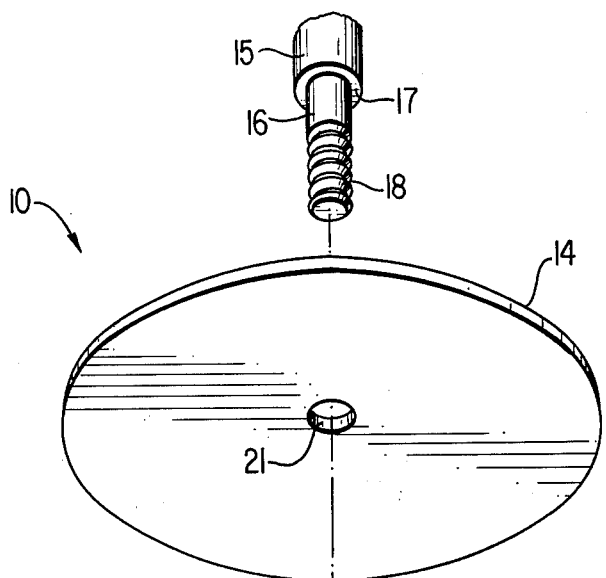
FIG. 1 is an exploded perspective view of the invention.

The vegetation filament cutter head of this invention is generally indicated by the reference numeral 10 in the drawing. As shown by the exploded view in FIG. 1, the cutter head 10 comprises a circular base plate/or disk 11 having a central aperture 12 for receiving the reduced end 16 of a drive shaft 15, and a plurality of circumferentially spaced upstanding post-like members 13 fixedly secured to the upperside thereof by welding or other suitable means, a circular top plate 14 having a central aperture 21, spaced from the base plate 11 by the upstanding members 13 and a filament woven about the upstanding members 13 in a manner to be described. The reduced end 16 of a drive shaft 15 is inserted through the central openings 21 and 12 of the top and base plates 14 and 11 from above until the shoulder 17 on the shaft 15, where the reduced end 16 is connected to the remainder of the drive shaft, seats against the top plate, and the threaded end 18 of the reduced end portion 16 projects through the opening 12 in the base plate 11. A wing nut 19 having a threaded opening 20 is screwed onto the threaded end 18 of the shaft 15.

Figure 2:
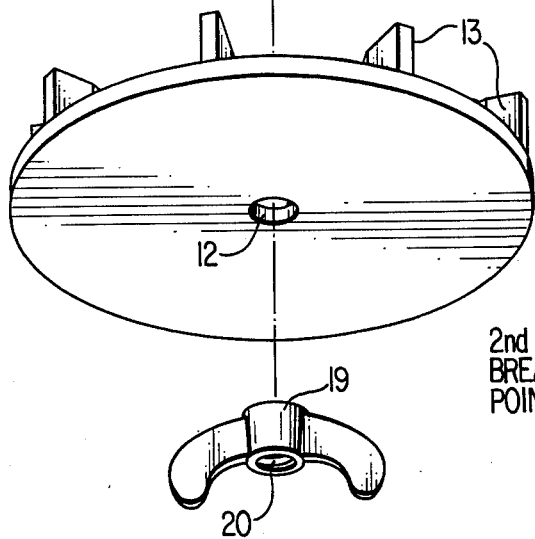
FIG. 2 is a top plan view of the invention with its top cover plate removed.
Figure 2:
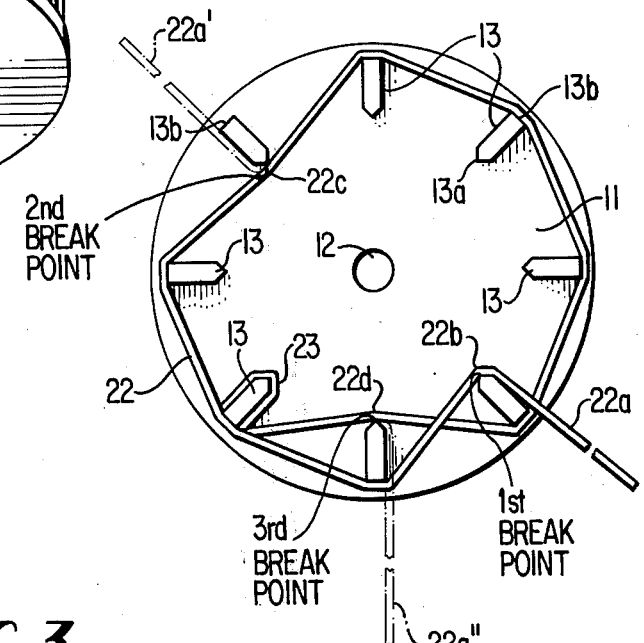

The shaft 15 is adapted to be driven from any suitable source of power (not shown). As best shown in FIG. 2, the upstanding members 13 are preferably spaced radially substantially equal distances from each other and from the center 12, and their rear ends are located adjacent to and an equal distance from the circumference of the disk 11. These upstanding members 13 are shown as flat ended and smooth at 13b adjacent the periphery of the disk and are sharpened at their inner ends 13a. These upstanding members 13 serve the purpose of supporting the cutter filament 22 which may be of any desired length and provided with a projecting cutter portion 22a. The filament 22 is woven about the elements 13 in a manner similar to the weaving of wicker baskets. One end of the filament is secured to one of the upstanding elements 13 as indicated at 23. It may be noted that in weaving the filament 22 about the elements 13, certain portions are wound about the outer flat rear end portions 13b of the upstanding elements and other portions extending inside the elements 13 and engaging the sharpened points 13a as indicated at 22b, 22c and 22d, these being designated as break points.

It will be understood that the upstanding elements 13 may be of any desired height so that any desired number of filaments may be wound about them with one end of each filament secured to one of the elements 13 and one cutting end portion similar to the portion 22a, preferably projecting from the cutter head at spaced radial intervals, thus providing for faster and more effective cutting than where a single projecting portion is provided.

Figure 3:
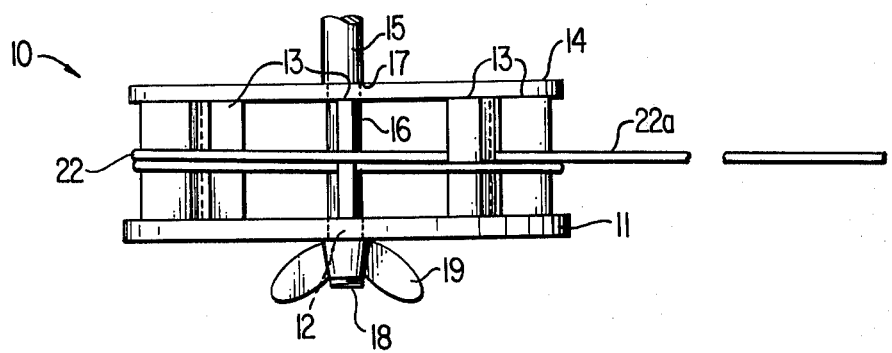
FIG. 3 is a side elevational view of the invention.

The operation of my improved cutter head will be largely apparent from the foregoing description. Assuming that the filament 22 has been woven about the element 13 in the manner previously described with a cutting portion 22a projecting from the cutter head as fragmentarily indicated in FIGS. 2 and 3, and with the filament engaging the sharpened point 13a of one of the elements 13 at points 22b, the cutter head is rotated through the drive shaft 15 by any suitable means (not shown). After a period of time, the sharpened edge 13a causes a breakage in the filament to occur at the point 22b referred to as first break point, thereupon the portion of the filament between the first break point 22b and the second break point 22c are swung clear of the cutter head by centrifugal force and the portion of the filament between these two break points 22b and 22c will then serve as a cutting element 22a' similar to the portion 22a previously described. After a further period of use, breakage of the filament will again occur at the second break point 22c, after which the portion of the filament between the second break point 22c and the third point 22d will swing clear of the intermediate elements 13 and this portion 22a'' will then function as a cutting element similar to the original cutting portion 22a.

As will be apparent from FIG. 2 of the drawings, the break points 22b and 22c are diametrically opposed and three upstanding elements 13 separate the break points. Accordingly since the elements 13 are arranged adjacent the circumference of the disk 11, the portion of the filament between the first and second break points 22b and 22c will exceed the diameter of the base plate or disk 11. Thus the protruding length 22a' will be greater than the diameter of the plate whereby a better whip action is obtained than is possible in U.S. Pat. No. 3,895,440 wherein the protruding portion of the cutting filament is always less than the diameter of the filament of the cutting disk. Similarly the break points 22c and 22d are so arranged on the disk 11, and the filament 22 is so arranged, that the length of the third protruding portion 22a'' after breakage at the point 22d will be greater than the diameter of the disk 11.

The filament may be formed of any suitable material including natural and synthetic fibers, the latter including nylon, which is strong and is preferably employed. Metal fibers make effective cutters for vegetation but ordinarily will not be used since there may be danger to the operator of the cutting apparatus or to others.

The invention has been described in detail for the purpose of illustration but it will be obvious that numerous modifications and variations may be resorted to without departing from the spirit of the invention in its broadest aspect, as set forth in the appended claims.

What is claimed is:

1. A vegetation filament cutter head comprising: a circular base, a plurality of upstanding members circumferentially spaced on the base, a filament engaging the plurality of the upstanding members, means for mounting the base for rotating and swinging a portion of the filament for cutting and means for retaining the filament during cutting.

2. A vegetation filament cutter head as recited in claim 1, the filament engaging the upstanding members in woven relation, passing inside and outside respective said members around said circumference.

3. A vegetation filament cutter head as recited in claim 2, the woven relation including the filament repetitively passing outside plural of said upstanding members then inside one of said upstanding members.

4. A vegetation filament cutter head as recited in claim 3, the portion of the filament passing outside plural of said upstanding members being greater in length than the diameter of the base.

5. A vegetation filament cutter head as recited in claim 3, respective of the upstanding members having means for selectively abrading said inside passing portions of the filament.

6. A vegetation filament cutter head as recited in claim 5, said selectively abrading means including a sharp edge.

7. A vegetation filament cutter head as recited in claim 6, said sharp edge facing away from the perimeter of the base.

8. A vegetation-filament cutter as recited in claim 5, said means for retaining the filament including means for covering the ends of the upstanding members.

9. A vegetation filament cutter as recited in claim 8, the means for covering being a plate and means for retaining the plate against the ends of the upstanding members.

10. A vegetation filament cutter as recited in claim 9, the means for retaining including the base having a first hole centrally therein and the plate having a second hole located in alignment with said first hole for passage therethrough of fastening means.

11. The method of making a cutter head as defined in claim 1 wherein a filament suitable for cutting vegetation is woven about the plurality of the upstanding members, a portion being passed about the outside of the members and a portion inside of the members, securing one end of the filament to a portion of the cutter head, and leaving a free end of substantial length projecting from the cutter head between a pair of elements to provide a weed cutting portion when the cutter is rotated.

12. The method as defined in claim 11 wherein the initial projecting portion of the filament is automatically separated from the remainder of the filament by abrasion with an inner portion of one of said upstanding elements.

* * * * *